US012111930B2

(12) United States Patent
Alasmari et al.

(10) Patent No.: US 12,111,930 B2
(45) Date of Patent: Oct. 8, 2024

(54) UTILIZING MACHINE LEARNING TO DETECT RANSOMWARE IN CODE

(71) Applicant: Saudi Arabian Oil Company, Dhahran (SA)

(72) Inventors: Maha Nasser Alasmari, Al Khobar (SA); Abdullah Abdulaziz Alturaifi, Dhahran (SA); Sultan Saadaldean Alsharif, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 247 days.

(21) Appl. No.: 17/818,262

(22) Filed: Aug. 8, 2022

(65) Prior Publication Data

US 2024/0045957 A1 Feb. 8, 2024

(51) Int. Cl.
G06F 21/56 (2013.01)
(52) U.S. Cl.
CPC .......... *G06F 21/566* (2013.01); *G06F 21/568* (2013.01)
(58) Field of Classification Search
None
See application file for complete search history.

(56) References Cited

U.S. PATENT DOCUMENTS

| 9,807,115 | B2 | 10/2017 | Kolton et al. | |
| 10,841,333 | B2 | 11/2020 | Levy | |
| 10,893,068 | B1* | 1/2021 | Khalid | G06F 21/554 |
| 2019/0138724 | A1* | 5/2019 | Stahlberg | G06F 21/554 |
| 2020/0089876 | A1* | 3/2020 | Aharoni | G06F 21/554 |
| 2020/0097650 | A1* | 3/2020 | Golan | G06F 21/554 |
| 2020/0374106 | A1 | 11/2020 | Padmanabhan | |
| 2021/0026961 | A1* | 1/2021 | Underwood | G06F 16/9027 |

(Continued)

FOREIGN PATENT DOCUMENTS

KR 20210144452 11/2021

OTHER PUBLICATIONS acronis.com [online], "Acronis Machine Learning Improves Ransomware Detection," Nov. 2017, retrieved Jul. 13, 2022, retrieved from URL <https://www.acronis.com/en-us/blog/posts/acronis-machine-learning-improves-ransomware-detection/>, 7 pages.

(Continued)

*Primary Examiner* — Benjamin E Lanier
(74) *Attorney, Agent, or Firm* — Fish & Richardson P.C.

(57) ABSTRACT

Implementations can provide a method that includes: accessing the source code of a script hosted by a remote server; extracting features from the source code in accordance with a machine-learning model comprising one or more layers of logic; at least based on the machine-learning model, determining, for each of the extracted features, a corresponding probability conditioned on the source code containing ransomware; and at least based on the machine-learning model, determining a combined probability for the extracted features conditioned on the source code containing ransomware when the extracted features are jointly present; comparing the combined probability with a threshold; in response to determining that the combined probability exceeds the threshold, flagging the source code as containing ransomware; and in response to determining that the combined probability does not exceed the threshold, flagging the source code as not containing ransomware.

20 Claims, 5 Drawing Sheets

(56) References Cited

U.S. PATENT DOCUMENTS

| | | |
|---|---|---|
| 2021/0240825 A1 | 8/2021 | Kutt et al. |
| 2021/0240826 A1 | 8/2021 | Kutt et al. |
| 2023/0244916 A1* | 8/2023 | Stokes, III ............. G06N 3/047 706/20 |

OTHER PUBLICATIONS

Cen et al., "A Probabilistic Discriminative Model for Android Malware Detection with Decompiled Source Code," IEEE Journals & Magazine | IEEE Xplore, 2013, 14 pages.

checkpoint.com [online], "What Is Ransomware?" available on or before Aug. 12, 2020 via Wayback Machine Internet Archive URL <https://web.archive.org/web/20200901000000*/https://www.checkpoint.com/cyber-hub/threat-prevention/Ransomware/>, retrieved Jul. 13, 2022, retrieved from URL <https://www.checkpoint.com/cyber-hub/threat-prevention/Ransomware/ >, 11 pages.

comparitech.com [online], "What Is an Exploit Kit (With Examples) And How Do Cybercriminal Use Them?" Compritech, May 2019, retrieved Jul. 13, 2022, retrieved from URL <https://www.comparitech.com/blog/information-security/exploit-kits>, 11 pages.

computerhope.com [online], "Executable File," Computer Hope, Dec. 2018, retrieved Jul. 13, 2022, retrieved from URL <https://www.computerhope.com/jargon/e/execfile.htm>, 1 page.

cybereason.com [online], "A Brief History of Ransomware Evolution," Freed, Cybereason, Nov. 2021, retrieved Jul. 13, 2022, retrieved from URL <https://www.cybereason.com/blog/a-brief-history-of-Ransomware-evolution >, 11 pages.

emsisoft.com [online], "How Ransomware Spreads: 9 Most Common Infection Methods and How to Stop Them," Emsisoft, Dec. 2019, retrieved Jul. 13, 2022, retrieved from URL <https://blog.emsisoft.com/en/35083/how-Ransomware-spreads-9-most-common-infection-methods-and-how-to-stop-them/>, 9 pages.

infosecinstitute.com [online], "A Brief Summary of Encryption Method Used In Widespread Ransomware," Infosec, Jan. 2017, retrieved Jul. 13, 2022, retrieved from URL <https://resources.infosecinstitute.com/topic/a-brief-summary-of-encryption-method-used-in-widespread-ransomware/#gref>, 19 pages.

Iwamoto et al., "Malware Classification based on Extracted API Sequences using Static Analysis," presented at the Proceedings of the Asian Internet Engineering Conference, Bangkok, Thailand, 2012, 8 pages.

Khammas, "Ransomware Detection Using Random Forest Technique," ICT Express, Dec. 2020, 6(4):325-331, 7 pages.

lifewire.com [online], "What Is a Floppy Disk Drive?" Lifewire, Fisher, Jan. 18, 2022, retrieved Jul. 13, 2022, retrieved from URL <https://www.lifewire.com/what-is-a-floppy-drive-2618151>, 5 pages.

Poudyal et al., "A Multi-Level Ransomware Detection Framework using Natural Language Processing and Machine Learning," International Conference on Malicious and Unwanted Software, Oct. 2019, 8 pages.

purplesec.us [online], "2021 Ransomware Statistics, Data, & Trends," Purplesec, 2021, retrieved Jul. 13, 2022, retrieved from URL <https://purplesec.us/resources/cyber-security-statistics/Ransomware/>, 21 pages.

Qiao et al., "Merging Permission and API Features for Android Malware Detection," 5th IIAI International Congress on Advanced Applied Informatics, 2016, 6 pages.

spinbackup.com [online] "Ransomware Detection Using Machine Learning," Dec. 2019, retrieved Jul. 13, 2022, retrieved from URL <https://spinbackup.com/blog/ransomware-detection-using-machine-learning/>, 10 pages.

techtarget.com [online], "The History and Evolution of Ransomware," Harford, Oct. 2021, URL <https://www.techtarget.com/searchsecurity/feature/The-history-and-evolution-of-Ransomware>, 6 pages.

websitebuilders.com [online], "Executable File Definition | The Interactive Glossary," available on or before Sep. 20, 2020 via Internet Archive Way Back Machine URL <https://web.archive.org/web/20200920052019/https://websitebuilders.com/how-to/glossary/executable_file/>, retrieved Jul. 13, 2022, retrieved from URL <https://websitebuilders.com/how-to/glossary/executable_file/>, 6 pages.

\* cited by examiner

UTILIZING MACHINE LEARNING TO DETECT RANSOMWARE IN CODE

TECHNICAL FIELD

This disclosure generally relates to the detection of malware, for example, ransomware.

BACKGROUND

Malware is generally used to refer to malicious software (e.g., including a variety of hostile, intrusive, and/or otherwise unwanted software). Ransomware is a type of malware that attacks computers by holding the user data hostage and demanding a ransom payment. Ransomware, and malware in general, can disrupt computer and/or network operations, steal proprietary information, and/or gain access to private/proprietary computer systems and/or computer networks.

SUMMARY

In one aspect, some implementations provide a computer-implemented method for screening a source code for ransomware before the source code can be executed by a local computer, the method including: accessing the source code of a script hosted by a remote server; extracting features from the source code in accordance with a machine-learning model comprising one or more layers of logic; at least based on the machine-learning model, determining, for each of the extracted features, a corresponding probability conditioned on the source code containing ransomware; and at least based on the machine-learning model, determining a combined probability for the extracted features conditioned on the source code containing ransomware when the extracted features are jointly present; comparing the combined probability with a threshold; in response to determining that the combined probability exceeds the threshold, flagging the source code as containing ransomware; and in response to determining that the combined probability does not exceed the threshold, flagging the source code as not containing ransomware.

Implementations may include one or more of the following features.

The operation of extracting features may include: extracting keywords corresponding to at least one category of: a file input/output (TO) operation, a cryptography operation, a key generating operation, and a data communication operation, and wherein the keywords are combined to be processed through the one or more layers of logic of the machine-learning model.

The computer-implemented method may further include: at least based on the model, determining, for each of the extracted features, a corresponding probability conditioned on the source code not containing ransomware. The computer-implemented method may further include: at least based on the model, determining a combined probability for the extracted features conditioned on the source code not containing ransomware when the extracted features are jointly present. The operation of comparing the combined probability with a threshold may include: comparing the combined probability for the extracted features conditioned on the source code containing ransomware when the extracted features are jointly present with the combined probability for the extracted features conditioned on the source code not containing ransomware when the extracted features are jointly present.

The computer-implemented method may further include: in response to flagging the source code as containing ransomware, blocking the script from execution by the local computer. The computer-implemented method may further include: in response to flagging the source code as containing ransomware, blacklisting the remote server hosting the script.

In another aspect, some implementations provide a computer system for screening a source code for ransomware, the computer system comprising one or more processors configured to perform operations of: accessing the source code of a script hosted by a remote server; extracting features from the source code in accordance with a machine-learning model comprising one or more layers of logic; at least based on the machine-learning model, determining, for each of the extracted features, a corresponding probability conditioned on the source code containing ransomware; and at least based on the machine-learning model, determining a combined probability for the extracted features conditioned on the source code containing ransomware when the extracted features are jointly present; comparing the combined probability with a threshold; in response to determining that the combined probability exceeds the threshold, flagging the source code as containing ransomware; and in response to determining that the combined probability does not exceed the threshold, flagging the source code as not containing ransomware.

Implementations may include one or more of the following features.

The operation of extracting features may include: extracting keywords corresponding to at least one category of: a file input/output (IO) operation, a cryptography operation, a key generating operation, and a data communication operation, and wherein the keywords are combined to be processed through the one or more layers of logic of the machine-learning model.

The operations may further include: at least based on the model, determining, for each of the extracted features, a corresponding probability conditioned on the source code not containing ransomware. The operations may further include: at least based on the model, determining a combined probability for the extracted features conditioned on the source code not containing ransomware when the extracted features are jointly present. The operation of comparing the combined probability with a threshold may include: comparing the combined probability for the extracted features conditioned on the source code containing ransomware when the extracted features are jointly present with the combined probability for the extracted features conditioned on the source code not containing ransomware when the extracted features are jointly present.

The operations may further include: in response to flagging the source code as containing ransomware, blocking the script from execution by the local computer. The operations may further include: in response to flagging the source code as containing ransomware, blacklisting the remote server hosting the script.

In yet another aspect, some implementations provide a non-transitory computer-readable medium comprising software, which, when executed by a computer, causes the computer to execute operations of: accessing the source code of a script hosted by a remote server; extracting features from the source code in accordance with a machine-learning model comprising one or more layers of logic; at least based on the machine-learning model, determining, for each of the extracted features, a corresponding probability conditioned on the source code containing ransomware; and at least based on the machine-learning model, determining a combined probability for the extracted features conditioned on the source code containing ransomware when the extracted features are jointly present; comparing the combined probability with a threshold; in response to determining that the combined probability exceeds the threshold, flagging the source code as containing ransomware; and in response to determining that the combined probability does not exceed the threshold, flagging the source code as not containing ransomware.

Implementations may include one or more of the following features.

The operation of extracting features may include: extracting keywords corresponding to at least one category of: a file input/output (IO) operation, a cryptography operation, a key generating operation, and a data communication operation, and wherein the keywords are combined to be processed through the one or more layers of logic of the machine-learning model.

The operations may further include: at least based on the model, determining, for each of the extracted features, a corresponding probability conditioned on the source code not containing ransomware. The operations may further include: at least based on the model, determining a combined probability for the extracted features conditioned on the source code not containing ransomware when the extracted features are jointly present. The operation of comparing the combined probability with a threshold may include: comparing the combined probability for the extracted features conditioned on the source code containing ransomware when the extracted features are jointly present with the combined probability for the extracted features conditioned on the source code not containing ransomware when the extracted features are jointly present.

The operations may further include: in response to flagging the source code as containing ransomware, blocking the script from execution by the local computer. The operations may further include: in response to flagging the source code as containing ransomware, blacklisting the remote server hosting the script.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

Figure 1:
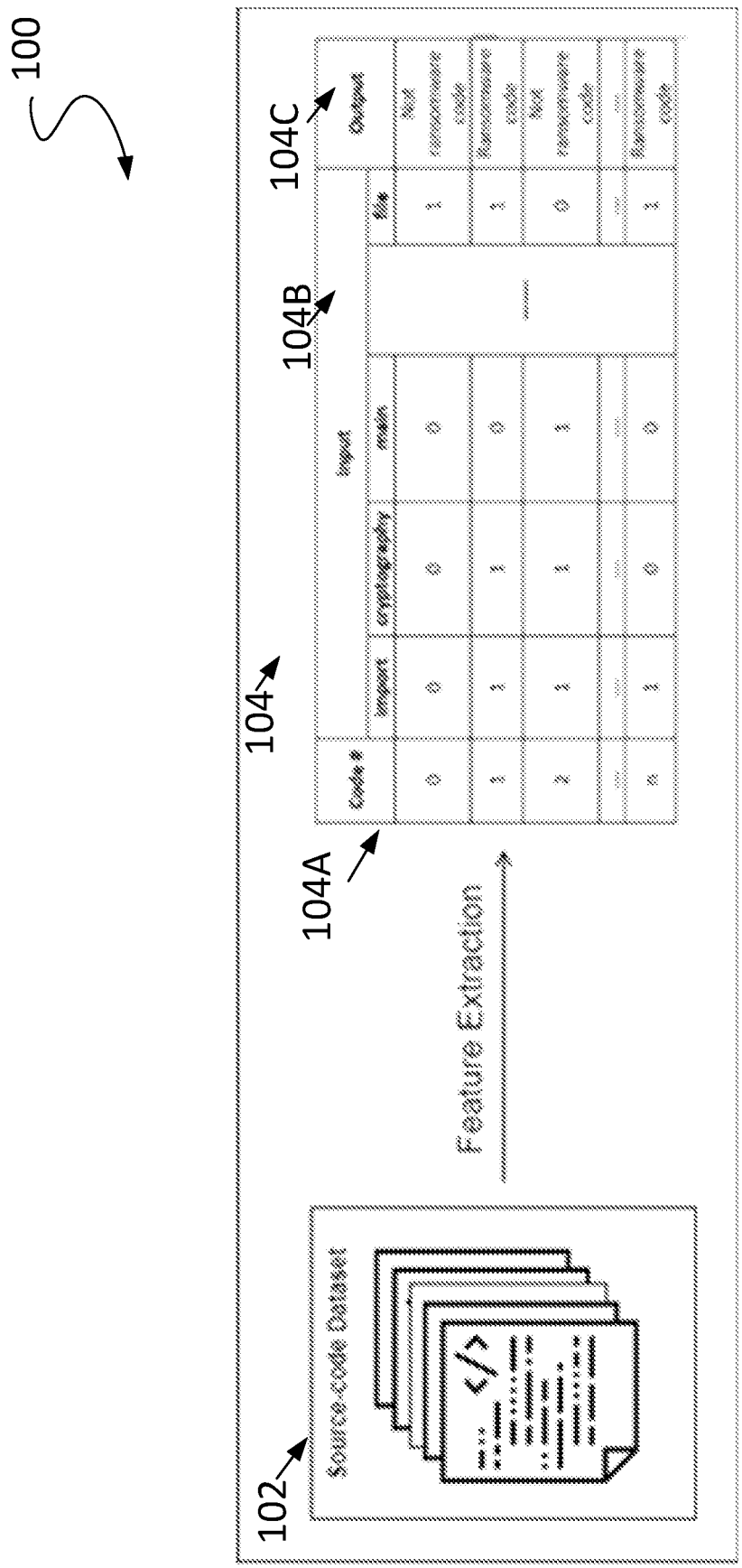
FIG. 1 illustrates an example of screening for ransomware according to an implementation of the present disclosure.

The disclosed technology is directed to system and method for detecting ransomware codes, as may be experienced by users on an enterprise network when accessing the outside Internet. Implementations may operate as a software filter that is activated each time the user comes across a script on an external website. The implementations may build a dataset of such scripts by separately storing the source codes in, for example, a demilitarized zone (DMZ) in a perimeter network of the enterprise network, for analysis. The implementations may then extract features from the source code of each script. The features can be textual features such as words captured from the scripts. The words are highly indicative of the function performed by the relevant portions of the script. Some implementations may establish a correlation between a feature (or a combination of the features) and a determination of ransomware. In some cases, the correlation is qualified as a probability. The implementations may then build a model based on the data set so that, when faced with a new script, the implementations may analyze the features of the new script according to the data model. When the analysis reveals that the probability of ransomware exceeds a given threshold, an alarm may be triggered, and the script may be stopped in the tracks. The website may be blocked or blacklisted.

Some implementations incorporate machine learning algorithms to build a model and train the model based on the dataset. For example, the implementations may incorporate naïve Bayes methods as a set of supervised learning algorithms by applying Bayes' theorem with the "naive" assumption of conditional independence between every pair of features given the value of the class variable. The implementations may use the naïve Bayes methods to build and train the model. When introducing new source code to the model, the implementations may start by calculating the probability of each word occurring in both ransomware and ransomware-tree code. The implementations may then combine the calculated probabilities for all code words in each category (ransomware and not a ransomware). The implementations may then classify the source code in the category with the highest probability. In some cases, the implementations may incorporate Maximum A Posteriori (MAP) estimation to estimate the relative probability of class y (e.g., ransomware) based on multiple observations of probability of $x_n$ (e.g., the n features such as keywords) occurring under class y. By developing a machine learning model that identifies ransomware codes, the implementations may effectively reduce the risk of exposing computer system and data to a would-be ransomware when running external code. The implementations may be used on a variety of platforms (e.g., desktops, mobile devices, gaining platforms, embedded systems, etc.) and/or a variety of types of applications (e.g., Android Application Package (apk) files, iOS applications, Windows PE files, Adobe Acrobat PDF files, etc.).

Referring to diagram MO in FIG. 1, implementations may leverage machine-learning methods to build a dataset and train a model for triaging ransomware. For example, some implementations may build a dataset 102 of source-codes. The dataset 102 may be accumulated each time a user on the enterprise network encounters a script on an external website. For example, the website can be a universal resource link (URL). The website can also be an external proxy. Some implementations may utilize a web crawler, a spider, or a hot that downloads and indexes content from selected websites or all over the Internet. As the websites and the Internet are constantly changing and expanding, a web crawler can start from a seed, or a list of known URLs. The web crawler may also spawn multiple bots to pursue a divide-n-conquer strategy when traversing the Internet.

The source code can be in number of languages including, for example, Hyper Text Makeup Language (HTML), JavaScript (JS), Python, and/or other programing/scripting languages. These source codes can contain portions that engage in clandestine and illegal behaviors, to, for example, encrypt at least some of the user's files, and deprive the user of access to the encrypted files unless a ransom is paid. This type of software is known as ransomware, which is a of computer malware that encrypts personal files, renders the personal files inaccessible, and demands a ransom payment before access can be restored. Personal files that are the target of most ransomware include documents, databases, source codes, pictures, videos, and so on, and Bitcoin, a digital currency, is commonly used as ransom currency. Ransomware has proven to be a persistent and serious threat to critical services such as healthcare providers, government and business systems. The average Ransomware payment in 2021 has increased by 82 percent year by year to reach $570,000, while the highest ransom demand has been observed to be $100 million in the same year. Ransomware attacks are becoming more popular over time because sophisticated attack tools are now available on the dark web for rent at a low cost and require little to no technical knowledge to deploy, which is known as Ransomware-as-a-Service (RaaS).

Ransomware can infect a device in a variety of ways, including phishing emails in which victims download compromised email attachments or click links that appear to be legitimate. Ransomware may also slip in via exploit kits, which are packages made up of various malicious tools and pre-written exploit code that are designed to exploit vulnerabilities in software applications and operating systems in order to spread malware, the most common target being systems that run out-of-elate software. Notably, within a network of computers, one single victim can be enough to compromise a whole organization because ransomware can identify neighboring computing nodes on the same subnet and spread itself to infect the neighboring computing nodes.

While ransomware codes generally differ from one another, ransomware codes are premised on the same concept. Indeed, most ransomware source codes share similar features. When the ransomware is executed, the execution will start encrypting the files on the victim's machine after generating the encryption keys at runtime or getting the encryption keys from the executable file if the keys were embedded there. Here, the executable file refers to the source code containing ransomware, which generally have a set of instructions to perform various functions or operations on computer system. In some examples of ransomware, the victim's machine information such as MAC address or hostname may be retrieved and sent alongside the encryption keys to the attacker's computer. The victim may not access the victim's own files without the decryption keys. In other words, once the ransom is paid, the victim may obtain the encryption keys and recover the victim's own files.

Some implementations incorporate machine-learning algorithms to build models of ransomware based on the dataset 102. For example, the implementations may extract features from each source code of the assembled dataset 102 of source code files. This process is also known as feature extraction and may include decomposing each source code into segments indicative of code behavior, especially in terms of file I/O operation, encryption, key generation, data communication, etc. As illustrated in FIG. 1, the extracted features may populate table 104, which can have a total of n rows, each corresponding to one source code. Table 104 may have columns encompassing each feature. Column area 104A shows the index for source codes in dataset 102. Column area 104B shows input features. As it the features include keywords on file I/O access (e.g., "import"), cryptography (e.g., "encrypt," "crypt"), key generation routine (e.g., "main," "key"), data communication (e.g., "socket," "open"). In one illustration, when the feature is present in the source code, the entry will be represented in the table by "1," and if not, the entry will be set to "0." In this illustration, source code 2 has the features corresponding to keywords of "import", "cryptography" and "main," but not the feature corresponding to the keyword of "file." Table 104 can represent a model training process based on input features as extracted from dataset 102 such that a prediction is generated as output 104C, which indicates whether, or not, a source code with the corresponding features is ransomware. Once a ransomware is detected, the source code containing such ransomware may not be executed, thereby thwarting a would-be attack. In some cases, the websites with the script that contains ransomware may be blocked, or blacklisted.

Figure 2:
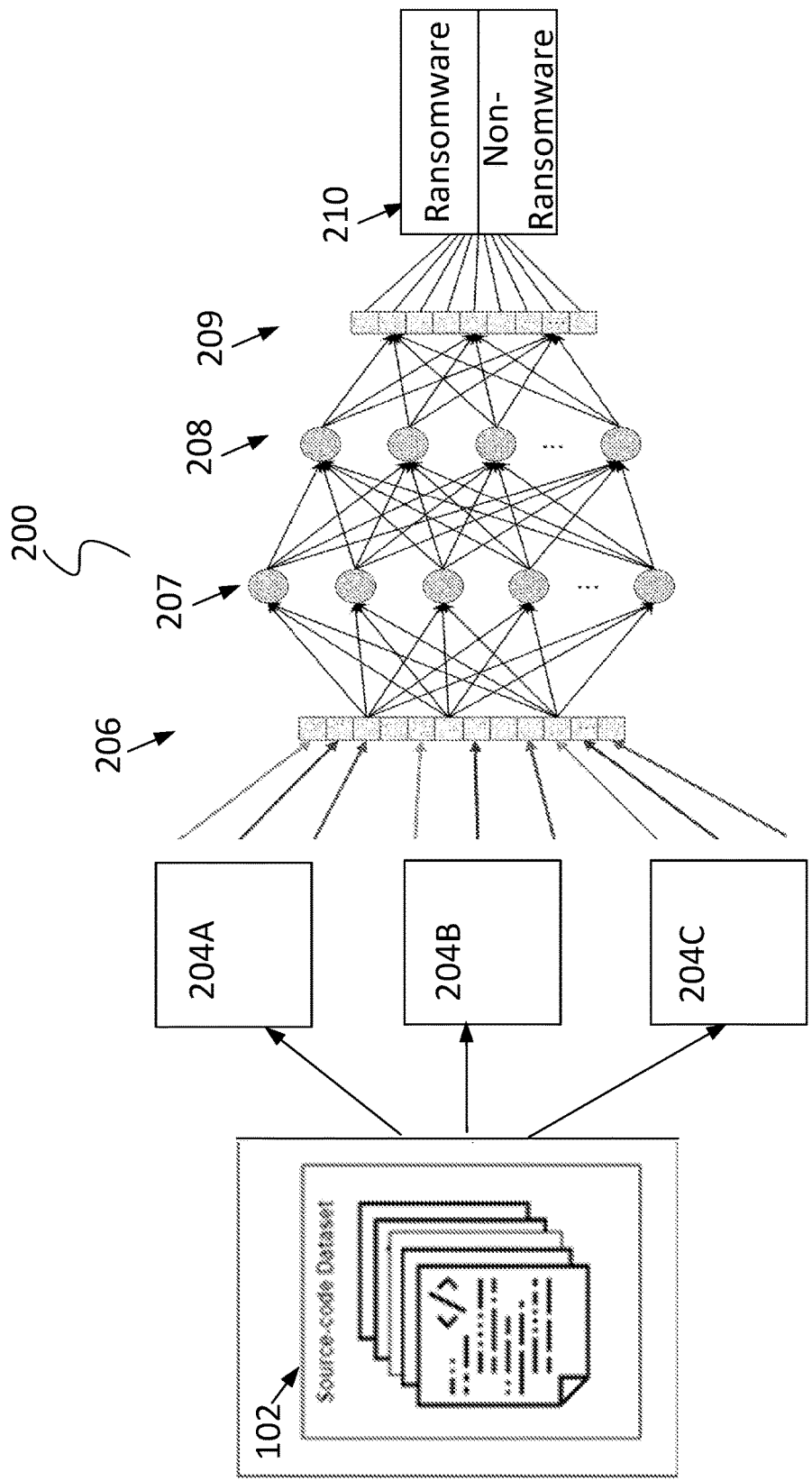
FIG. 2 illustrates another example of screening for ransomware according to an implementation of the present disclosure.

Further referring to diagram 200 of FIG. 2, implementations may incorporate a layered neural network in the classifier model for efficient and accurate detection of ransomware. Based on each source code in dataset 102, some implementations may extract feature vectors 204A, 204B, and 204C. In some cases, each feature vector corresponds to keywords, or set of keywords, as illustrated in diagram 100 of FIG. 1.

The set of the keywords may follow specific sequential order, or specific case order, matched to terms used by the scripting language. The feature vectors may then be concatenated together to form a max filter activation pooling 206. Implementations may incorporate a Convolutional Neural Network (CNN) for extracting features. The CNN feature extraction processing includes automatically learning features on the various data representations from source codes in dataset 102, which may be evolving and expanding. In an example implementation, a CNN architecture for this purpose incorporates parallel convolutional layers. The activation map of each filter undergoes global max pooling to become a single point of maximum activation. These resulting features are then all concatenated together a max filter activation pooling processing operation to form vector 206. In this example, this feature vector can be made of constant size regardless of the size of the underlying source code. As such, each activation map feature vector is then concatenated together to form a consolidated feature vector also of constant size that is equal to the number of filters in each parallel convolutional layer.

Subsequently, the above system processing can be performed on fully connected layers (training end-to-end) 207, 208, and 209. These connected layers can incorporate training an independent ensemble algorithm on top of the learned CNN features (e.g., features 204A, 204B, and 204C). At output stage 210, the actual classification on feature vector 206 can be performed statically to generate a determination whether or not the source code is ransomware. Once a ransomware is detected, implementations can block the execution of the source code containing. In some cases, the websites with the script that contains the ransomware may be blocked, or blacklisted.

Figure 3A:
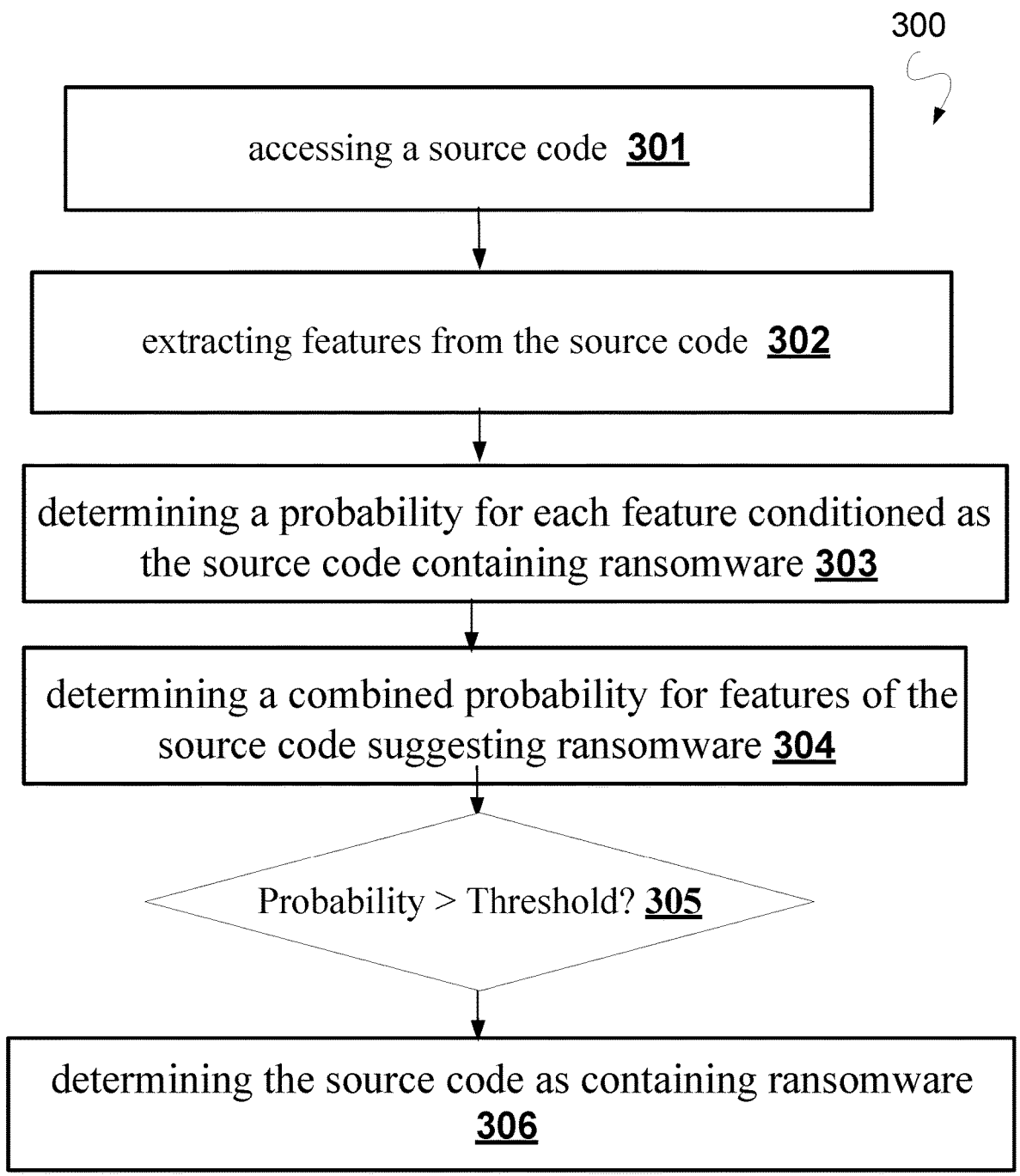
FIG. 3A illustrates a flow chart of an example of a process according to an implementation of the present disclosure.

FIG. 3A is a flow chart 300 illustrating an example of a process for some implementations. The process may initiate by accessing the source code of a script (301). As discussed above, the implementations aim at determining whether the source code of a script may contain malware. The script may be embedded at an external website when enterprise users access the Internet outside the enterprise network. The script may also be accessed when the enterprise user clicks on a link in an incoming email. Some implementations may set up a proxy for screening the scripts having source codes.

Next, the process may extract features from the source code (302). Some implementations may extract features that correspond to keywords, or set of keywords, as illustrated in diagram 100 of FIG. 1. The features may include keywords on file I/O access (e.g., "import"), cryptography (e.g., "encrypt," "crypt"), key generation routine e.g., "main," "key"), data communication (e.g., "socket," "open"). The implementations may concatenate the features together to form feature vectors for a max filter activation pooling. The implementations may incorporate a Convolutional Neural Network (CNN) for extracting features.

The process may then determine a probability for each feature as a conditional probability with the condition being the source code containing ransomware (303). The process may then determine the combined probability for each known feature in the model, each corresponding to a conditional probability with the condition being the source code containing ransomware (304). In some cases, the process may also determine a probability for each feature as a conditional probability with the condition being the source code not containing ransomware. In these cases, the process may then determine the combined probability for each known feature in the model, each feature having a corresponding conditional probability with the condition being the source code not containing ransomware.

The process may then compare the determined probability with a threshold level (305). For example, the process may compare the combined probability for model features being conditioned on the source code containing ransomware with a pre-determined threshold level. In this example, when the combined probability for the source code as containing ransomware exceeds the pre-determined threshold level, the process determines the source code as containing ransomware (306). In another example, the process may also compare the combined probability for model features being conditioned on the source code containing ransomware with the combined probability for model features being conditioned on the source code not containing ransomware. In this example, when the combined probability for the source code as containing ransomware exceeds the combined probability for the source code as not containing ransomware, the process determines the source code as containing ransomware (306), Once the process determines the source code as containing ransomware, the script containing the source code may be blocked. In some cases, the website hosting the script may be blocked or blacklisted.

Figure 3B:
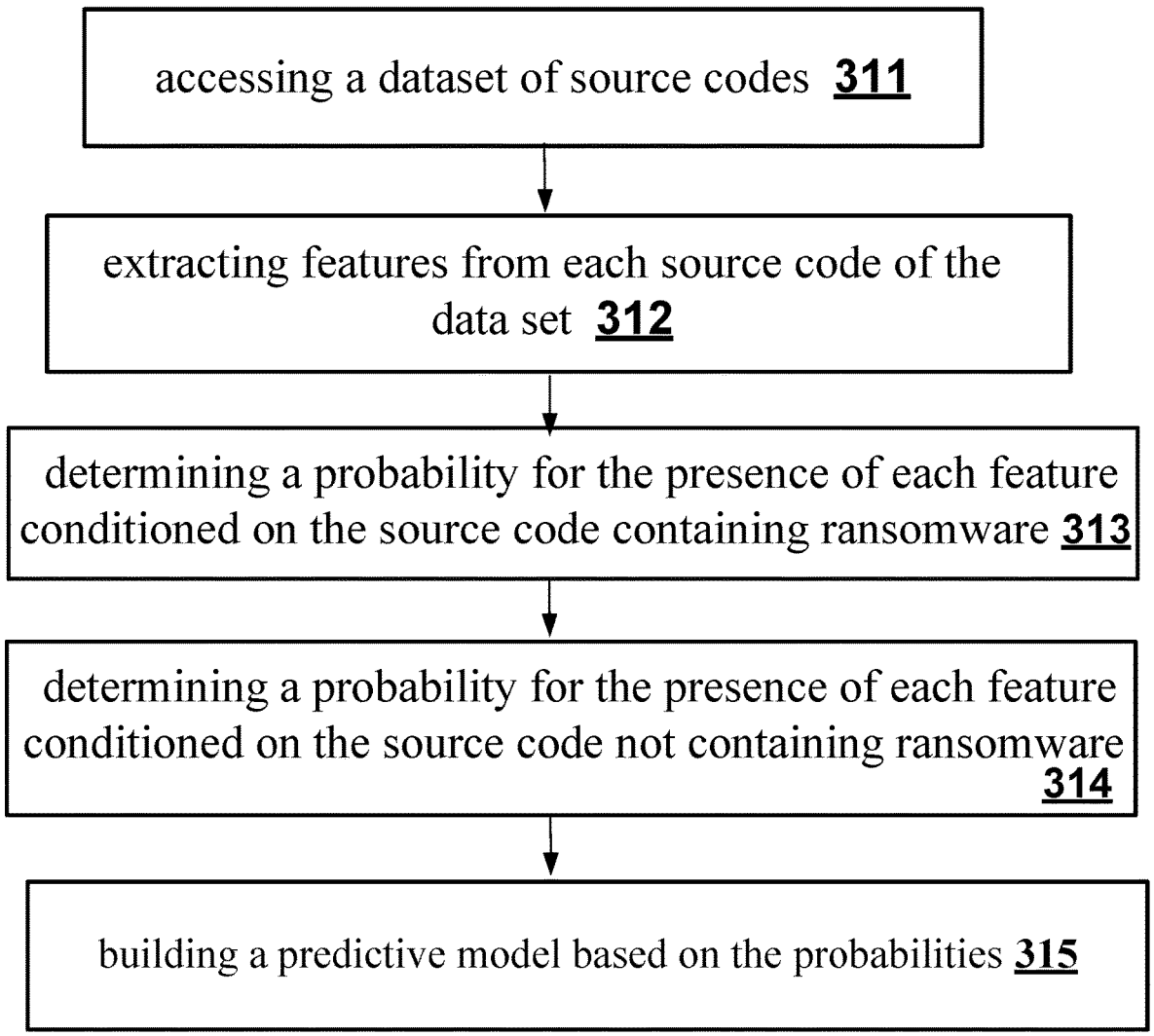
FIG. 3B illustrate a flow chart of another example of a process according to an implementation of the present disclosure.

FIG. 3B illustrates another process 310 for some implementations when building and training a model for ransomware detection. The process may start with accessing a database of source codes (311) (e.g., dataset 102 in FIG. 1). As discussed above, the implementations may set up a proxy engine and engage bots to build up a dataset of scripts from external websites. For example, the implementations may launch a web crawler that spawn multiple bob; to pursue a divide-n-conquer strategy when traversing the Internet.

Next, the process may extract features from each source code of the dataset (312). Some implementations may extract features that correspond to keywords, or set of keywords, such as keywords on file I/O access (e.g., "import"), cryptography (e.g., "encrypt," "crypt"), key generation routine (e.g., "main," "key"), data communication (e.g., "socket," "open"). The implementations may concatenate the features together to form feature vectors for a max filter activation pooling, and may incorporate a Convolutional Neural Network (CNN) for extracting features. The CNN feature extraction processing may include automatically learning features on the various data representations from source codes in dataset 102, which may be evolving and expanding.

The process may then determine a probability for the presence of each feature as a conditional probability with the condition being the source code containing ransomware (313). The process may also determine the probability for the presence of each feature as a conditional probability with the condition being the source code not containing ransomware (314). The process may repeat the determinations for each feature in the model, and may repeat the determinations when new source code is being added to the dataset. In these cases, the process builds and enriches a predictive model based on the extracted features and the corresponding conditional probabilities (315).

Various implementations perform analysis of source code using a machine learning model to identify and detect potential ransomware based on common features/keywords and patterns. Ransomware code may attempt to access users files and use encryption to encrypt and lock the files; ransomware code may also be searching for backup files and delete the backup files to force the user to pay the ransom in order to get the files back. By way of illustration, implementations may utilize toolsets from the Scikit-learn library in Python, which provide many machine-learning (ML) algorithms. The ML implementation may start by extracting the features and keywords used in the source-codes, and then analyzing the pattern of such features to identify most probable ransomware importing libraries to access users files and backup files, importing encryption libraries to encrypt local files, using functions that deletes backup files, modifying access rights to such local files, and establishing connection with external entity to send the encryption keys after the files encryption is completed), The ML implementations may incorporate Bayes algorithm to train/build the models.

Figure 4:
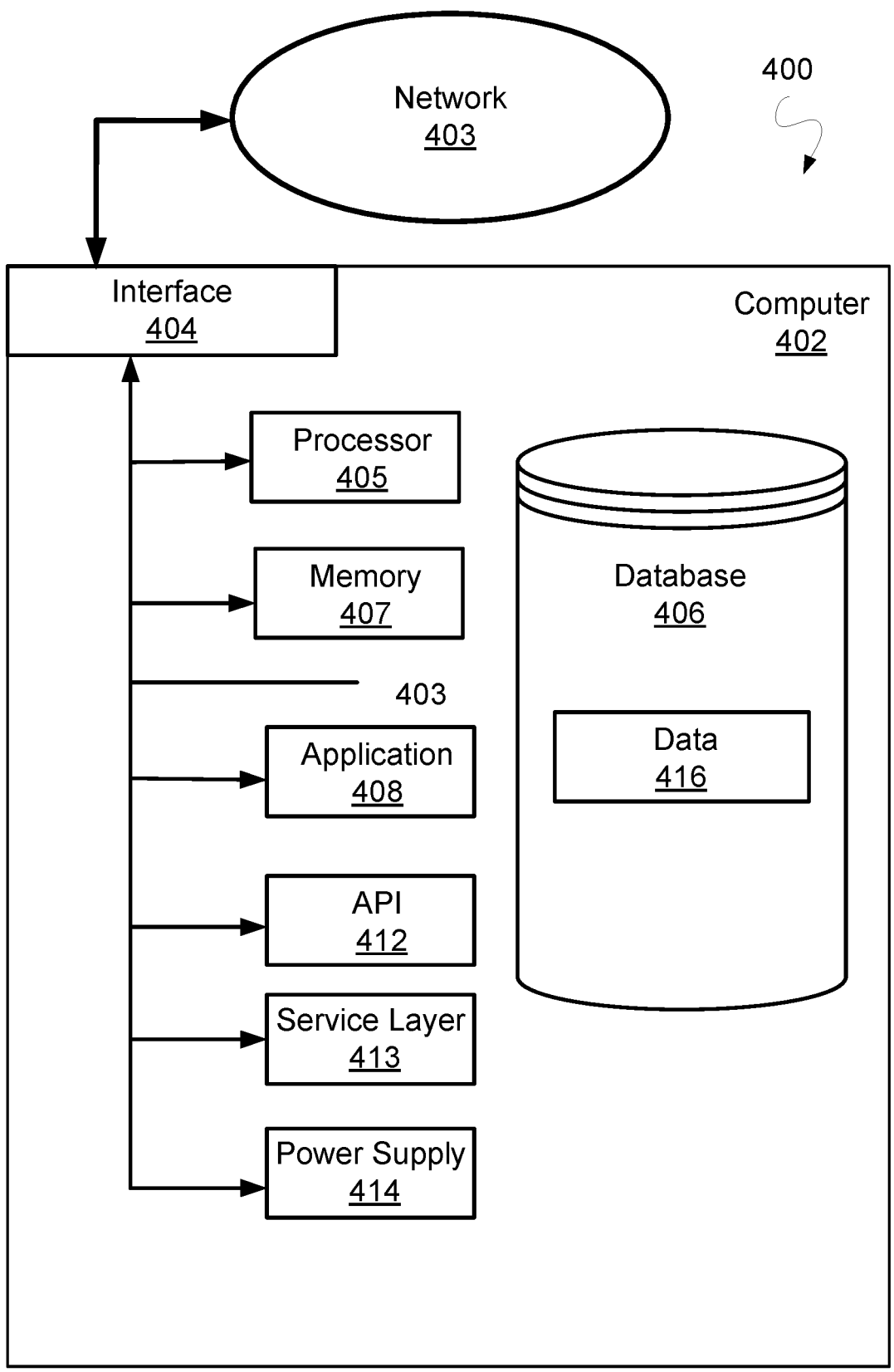
FIG. 4 is a block diagram illustrating an example of a computer system used to provide computational functionalities associated with described algorithms, methods, functions, processes, flows, and procedures, according to an implementation of the present disclosure.

FIG. 4 is a block diagram illustrating an example of a computer system 400 used to provide computational functionalities associated with described algorithms, methods, functions, processes, flows, and procedures, according to an implementation of the present disclosure. The illustrated computer 402 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 402 can comprise a computer that includes an input device, such as a keypad, keyboard, touch screen, another input device, or a combination of input devices that can accept user information, and an output device that conveys information associated with the operation of the computer 402, including digital data, visual, audio, another type of information, or a combination of types of information, on a graphical-type user interface (UI) (or GUI) or other UI.

The computer 402 can serve in a role in a computer system as a client, network component, a server, a database or another persistency, another role, or a combination of roles for performing the subject matter described in the present disclosure. The illustrated computer 402 is communicably coupled with a network 403. In some implementations, one or more components of the computer 402 can be configured to operate within an environment, including cloud-computing-based, local, global, another environment, or a combination of environments.

The computer 402 is an electronic computing device operable to receive, transmit, process, store, or manage data and information associated with the described subject matter. According to some implementations, the computer 402 can also include or be communicably coupled with a server, including an application server, e-mail server, web server, caching server, streaming data server, another server, or a combination of servers.

The computer 402 can receive requests over network 430 (for example, from a client software application executing on another computer 402) and respond to the received requests by processing the received requests using a software application or a combination of software applications. In addition, requests can also be sent to the computer 402 from internal users, external or third-parties, or other entities, individuals, systems, or computers.

Each of the components of the computer 402 can communicate using a system bus 403. In some implementations, any or all of the components of the computer 402, including hardware, software, or a combination of hardware and software, can interface over the system bus 403 using an application programming interface (API) 412, a service layer 413, or a combination of the API 412 and service layer 413. The API 412 can include specifications for routines, data structures, and object classes. The API 412 can be either computer-language independent or dependent and refer to a complete interface, a single function, or even a set of APIs. The service layer 413 provides software services to the computer 402 or other components (whether illustrated or not) that are communicably coupled to the computer 402. The functionality of the computer 402 can be accessible for all service consumers using this service layer. Software services, such as those provided by the service layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 402, alternative implementations can illustrate the API 412 or the service layer 413 as stand-alone components in relation to other components of the computer 402 or other components (whether illustrated or not) that are communicably coupled to the computer 402. Moreover, any or all parts of the API 412 or the service layer 413 can be implemented as a child or a sub-module of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402. The interface 404 is used by the computer 402 for communicating with another computing system (whether illustrated or not) that is communicatively linked to the network 430 in a distributed environment. Generally, the interface 404 is operable to communicate with the network 430 and comprises logic encoded in software, hardware, or a combination of software and hardware. More specifically, the interface 404 can comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors can be used according to particular needs, desires, or particular implementations of the computer 402. Generally, the processor 405 executes instructions and manipulates data to perform the operations of the computer 402 and any algorithms, methods, functions, processes, flows, and procedures as described in the present disclosure.

The computer 402 also includes a database 406 that can hold data for the computer 402, another component communicatively linked to the network 430 (whether illustrated or not), or a combination of the computer 402 and another component. For example, database 406 can be an in-memory, conventional, or another type of database storing data consistent with the present disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases of similar or differing types can be used according to particular needs, desires, or particular implementations of the computer 402 and the described functionality. While database 406 is illustrated as an integral component of the computer 402, in alternative implementations, database 406 can be external to the computer 402. As illustrated in FIGS. 1-2, the database 406 holds the previously described dataset 102 and the predictive model being built, as data 416.

The computer 402 also includes a memory 407 that can hold data for the computer 402, another component or components communicatively linked to the network 430 (whether illustrated or not), or a combination of the computer 402 and another component. Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 or similar or differing types can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in the present disclosure. For example, application 408 can serve as one or more components, modules, or applications. Further, although illustrated as a single application 408, the application 408 can be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or another power management functionality). In some implementations, the power-supply 414 can include a power plug to allow the computer 402 to be plugged into a wall socket or another power source to, for example, power the computer 402 or recharge a rechargeable battery.

There can be any number of computers 402 associated with, or external to, a computer system containing computer 402, each computer 402 communicating over network 430. Further, the term "client," "user," or other appropriate terminology can be used interchangeably, as appropriate, without departing from the scope of the present disclosure. Moreover, the present disclosure contemplates that many users can use one computer 402, or that one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for screening a source code for ransomware before the source code can be executed by a local computer, the method comprising:
   accessing the source code of a script hosted by a remote server;
   extracting features from the source code in accordance with a machine-learning model comprising one or more layers of logic;
   at least based on the machine-learning model, determining, for each of the extracted features, a corresponding probability conditioned on the source code containing ransomware; and
   at least based on the machine-learning model, determining a combined probability for the extracted features conditioned on the source code containing ransomware when the extracted features are jointly present;
   comparing the combined probability with a threshold;
   in response to determining that the combined probability exceeds the threshold, flagging the source code as containing ransomware; and
   in response to determining that the combined probability does not exceed the threshold, flagging the source code as not containing ransomware.

2. The computer-implemented method of claim 1, wherein extracting features comprises: extracting keywords corresponding to at least one category of: a file input/output (IO) operation, a cryptography operation, a key generating operation, and a data communication operation, and
   wherein the keywords are combined to be processed through the one or more layers of logic of the machine-learning model.

3. The computer-implemented method of claim 1, further comprising:
   at least based on the model, determining, for each of the extracted features, a corresponding probability conditioned on the source code not containing ransomware.

4. The computer-implemented method of claim 3, further comprising:
   at least based on the model, determining a combined probability for the extracted features conditioned on the source code not containing ransomware when the extracted features are jointly present.

5. The computer-implemented method of claim 4, wherein comparing the combined probability with a threshold comprises:
   comparing the combined probability for the extracted features conditioned on the source code containing ransomware when the extracted features are jointly present with the combined probability for the extracted features conditioned on the source code not containing ransomware when the extracted features are jointly present.

6. The computer-implemented method of claim 1, further comprising:
   in response to flagging the source code as containing ransomware, blocking the script from execution by the local computer.

7. The computer-implemented method of claim 1, further comprising:
   in response to flagging the source code as containing ransomware, blacklisting the remote server hosting the script.

8. A computer system for screening a source code for ransomware, the computer system comprising one or more processors configured to perform operations of:
   accessing the source code of a script hosted by a remote server;
   extracting features from the source code in accordance with a machine-learning model comprising one or more layers of logic;
   at least based on the machine-learning model, determining, for each of the extracted features, a corresponding probability conditioned on the source code containing ransomware; and
   at least based on the machine-learning model, determining a combined probability for the extracted features conditioned on the source code containing ransomware when the extracted features are jointly present;
   comparing the combined probability with a threshold;
   in response to determining that the combined probability exceeds the threshold, flagging the source code as containing ransomware; and
   in response to determining that the combined probability does not exceed the threshold, flagging the source code as not containing ransomware.

9. The computer system of claim 8, wherein extracting features comprises: extracting keywords corresponding to at least one category of: a file input/output (IO) operation, a cryptography operation, a key generating operation, and a data communication operation, and
   wherein the keywords are combined to be processed through the one or more layers of logic of the machine-learning model.

10. The computer system of claim 8, wherein the operations further comprise:
    at least based on the model, determining, for each of the extracted features, a corresponding probability conditioned on the source code not containing ransomware when the feature is present.

11. The computer system of claim 10, wherein the operations further comprise:
    at least based on the model, determining a combined probability for the extracted features conditioned on the source code not containing ransomware when the extracted features are jointly present.

12. The computer system of claim 11, wherein comparing the combined probability with a threshold comprises:

comparing the combined probability for the extracted features conditioned on the source code containing ransomware when the extracted features are jointly present with the combined probability for the extracted features conditioned on the source code not containing ransomware when the extracted features are jointly present.

13. The computer system of claim 8, wherein the operations further comprise:
in response to flagging the source code as containing ransomware, blocking the script from execution by a local computer.

14. The computer system of claim 8, wherein the operations further comprise:
in response to flagging the source code as containing ransomware, blacklisting the remote server hosting the script.

15. A non-transitory computer-readable medium comprising software, which, when executed by a computer, causes the computer to execute operations of:
accessing the source code of a script hosted by a remote server;
extracting features from the source code in accordance with a machine-learning model comprising one or more layers of logic;
at least based on the machine-learning model, determining, for each of the extracted features, a corresponding probability conditioned on the source code containing ransomware; and
at least based on the machine-learning model, determining a combined probability for the extracted features conditioned on the source code containing ransomware when the extracted features are jointly present;
comparing the combined probability with a threshold;
in response to determining that the combined probability exceeds the threshold, flagging the source code as containing ransomware; and
in response to determining that the combined probability does not exceed the threshold, flagging the source code as not containing ransomware.

16. The non-transitory computer-readable medium of claim 15, wherein extracting features comprises: extracting keywords corresponding to at least one category of: a file input/output (IO) operation, a cryptography operation, a key generating operation, and a data communication operation, and
wherein the keywords are combined to be processed through the one or more layers of logic of the machine-learning model.

17. The non-transitory computer-readable medium of claim 15, wherein the operations further comprise:
at least based on the model, determining, for each of the extracted features, a corresponding probability conditioned on the source code not containing ransomware when the feature is present.

18. The non-transitory computer-readable medium of claim 17, wherein the operations further comprise:
at least based on the model, determining a combined probability for the extracted features conditioned on the source code not containing ransomware when the extracted features are jointly present.

19. The non-transitory computer-readable medium of claim 18, wherein comparing the combined probability with a threshold comprises:
comparing the combined probability for the extracted features conditioned on the source code containing ransomware when the extracted features are jointly present with the combined probability for the extracted features conditioned on the source code not containing ransomware when the extracted features are jointly present.

20. The non-transitory computer-readable medium of claim 15, wherein the operations further comprise:
in response to flagging the source code as containing ransomware, blocking the script from execution by a local computer; and
in response to flagging the source code as containing ransomware, blacklisting the remote server hosting the script.

* * * * *